United States Patent
Yamada

(10) Patent No.: US 12,022,015 B2
(45) Date of Patent: *Jun. 25, 2024

(54) METHOD FOR DISTRIBUTED AND SECURE TIMEKEEPING

(71) Applicant: D4D Group, San Francisco, CA (US)

(72) Inventor: Ken Yamada, San Francisco, CA (US)

(73) Assignee: D4D Group, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/877,471

(22) Filed: Jul. 29, 2022

(65) Prior Publication Data

US 2022/0393888 A1    Dec. 8, 2022

Related U.S. Application Data

(63) Continuation of application No. 16/752,592, filed on Jan. 24, 2020, now Pat. No. 11,438,181.

(60) Provisional application No. 62/797,184, filed on Jan. 25, 2019.

(51) Int. Cl.
*H04L 9/32* (2006.01)
*H04L 9/00* (2022.01)

(52) U.S. Cl.
CPC .......... *H04L 9/3297* (2013.01); *H04L 9/3236* (2013.01); *H04L 9/50* (2022.05)

(58) Field of Classification Search
CPC ....... H04L 9/3297; H04L 9/3236; H04L 9/50; H04L 9/12
See application file for complete search history.

(56) References Cited

U.S. PATENT DOCUMENTS

| | | | |
|---|---|---|---|
| 2007/0185814 A1* | 8/2007 | Boccon-Gibod | G06F 21/10 705/51 |
| 2016/0173352 A1* | 6/2016 | Danielsson | H04J 3/0676 370/252 |
| 2019/0266132 A1* | 8/2019 | Rubenstein | G06F 9/4881 |
| 2021/0135854 A1* | 5/2021 | Karame | H04L 9/3247 |

OTHER PUBLICATIONS

Wu et al. Cluster-Based Consensus Time Synchronization for Wireless Sensor Networks, IEEE sensors journal, vol. 15, No. 3, Mar. 2015 (Year: 2015).*

(Continued)

*Primary Examiner* — David J Pearson
(74) *Attorney, Agent, or Firm* — Run8 Patent Group, LLC; Peter Miller; Brian T. Chew

(57) ABSTRACT

One variation of a method for secure and distributed timekeeping includes: at a node in a set of nodes in a network, at a first time, sampling two time sources and calculating a minor consensus time between the two time sources; in response to designation of the node as a leader node, accessing a second minor consensus time generated by a second node, accessing a third minor consensus time generated by a third node, calculating a first major consensus time between the first, second, and third minor consensus times, and distributing a request to validate the first major consensus time; and, based on validation of the request from a threshold quantity of nodes, cryptographically hashing a hash of a previous block and the major consensus time to generate a first block and distributing the first block to each node in the set of nodes.

20 Claims, 1 Drawing Sheet

(56) References Cited

OTHER PUBLICATIONS

Fan et al. "Secure Time Synchronization Scheme in IoT based on Blockchain", 2018 IEEE Confs on Internet of Things, Green Computing and Communications, Cyber, Physical and Social Computing, Smart Data, Blockchain, Computer and Information Technology, Congress on Cybermatics (Year: 2018).*

Antonopoulos, "Mastering Bitcoin", O'Reilly Media, Inc, Dec. 2014 (Year: 2014).*

* cited by examiner

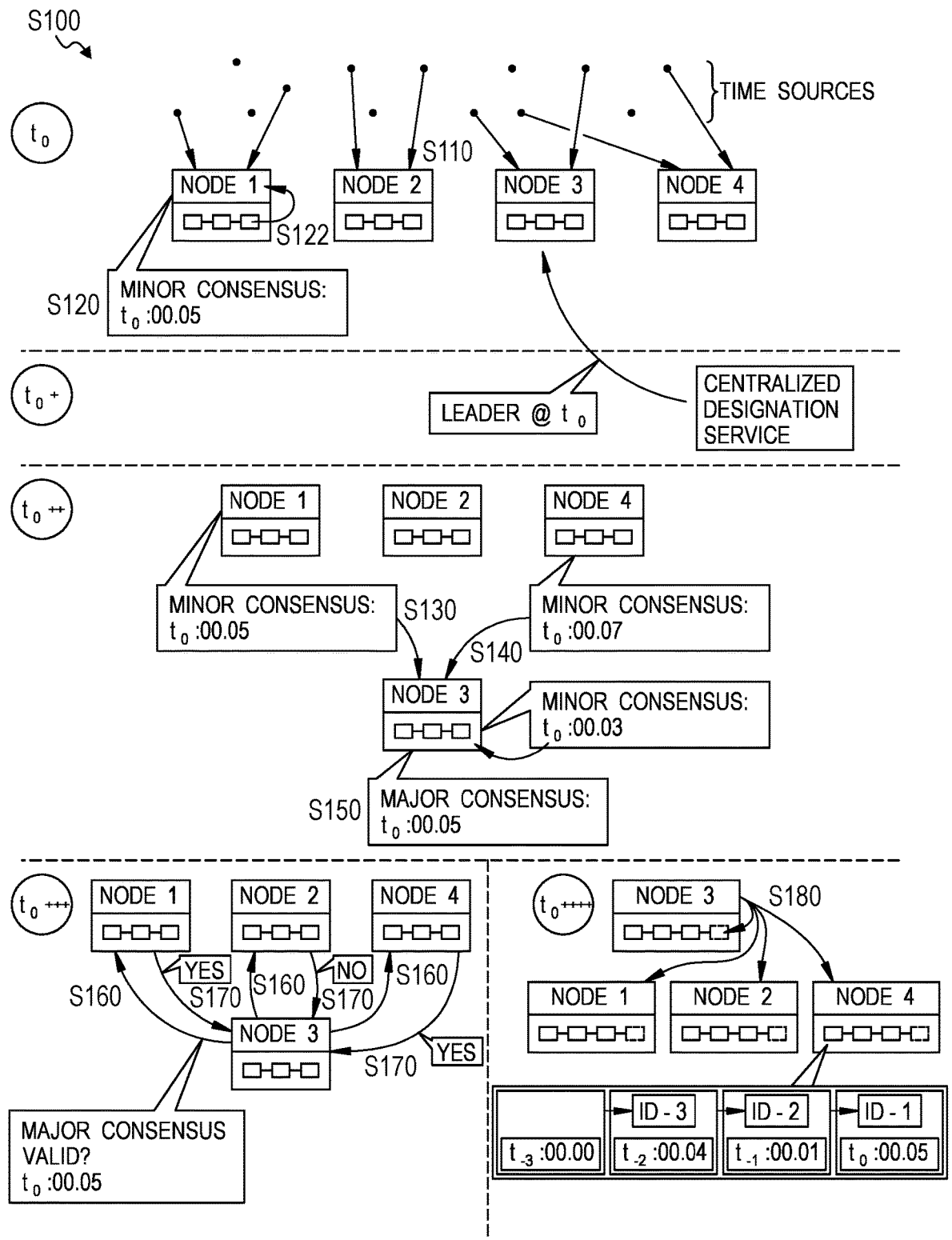

METHOD FOR DISTRIBUTED AND SECURE TIMEKEEPING

CROSS-REFERENCE TO RELATED APPLICATIONS

This application is a continuation application of U.S. patent application Ser. No. 16/752,592, filed on 24 Jan. 2020, which claims the benefit of U.S. Provisional Application No. 62/797,184, filed on 25 Jan. 2019, each of which is incorporated in its entirety by this reference.

TECHNICAL FIELD

This invention relates generally to the field of blockchain computing and more specifically to a new and useful method for timekeeping and timestamping in the field of blockchain computing.

BACKGROUND

Typically, sources of absolute time (as opposed to local relative time), such as coordinated universal time (hereinafter "UTC"), global positioning system time (hereinafter "GPS time"), long range navigation time (hereinafter "Loran-C time"), and Temps Atomique International (hereinafter "TAI"), are regularly accessed by computer systems around the world, via API requests over a network or other means. However, these, and other, centralized sources of time can be spoofed by malicious actors, thereby discouraging the use of time as a determining factor in important electronically implemented contracts or schedules, financial transactions, or any other sensitive computer implemented code.

BRIEF DESCRIPTION OF THE FIGURES

FIG. 1 is a flowchart representation of a method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIG. 1, a method S100 for secure and distributed timekeeping, includes, at a first node in a set of nodes in a network: at a first time, sampling two time sources in a set of time sources in Step S110; and calculating a first minor consensus time between the two time sources in Step S120. The method S100 also includes, in response to designation of the first node as a leader node for a first block: accessing a second minor consensus time generated by a second node in the set of nodes in Step S130; accessing a third minor consensus time generated by a third node in the set of nodes in Step S140; calculating a first major consensus time between the first minor consensus time, the second minor consensus time, and the third minor consensus time in Step S150; and distributing a request to validate the first major consensus time to each node in the set of nodes in Step S160. The method S100 further includes, in response to receiving validation of the request from a predefined threshold quantity of nodes in the set of nodes: cryptographically hashing a hash of a previous block and the major consensus time to generate a first block in Step S170; and distributing the first block to each node in the set of nodes in Step S180.

A variation of the method S100 for secure and distributed timekeeping includes, at a first node in a set of nodes and in response to receiving a first block comprising a first major consensus time: at a second time, sampling two time sources in a set of time sources in Step S110; calculating a first minor consensus time between the two time sources and the first major consensus time in Step S122. The variation of the method S100 also includes, in response to designation of the first node as a leader node for a second block: accessing a second minor consensus time generated by a second node in the set of nodes in Step S130; accessing a third minor consensus time generated by a third node in the set of nodes in Step S140; calculating a second major consensus time between the first minor consensus time, the second minor consensus time, and the third minor consensus time in Step S150; and distributing a request to validate the second major consensus time to each node in the set of nodes in Step S160. This variation of the method S100 further includes, in response to receiving validation of the request from a predefined threshold quantity of nodes in the set of nodes: cryptographically hashing a hash of the first block and the second major consensus time to generate the second block in Step S170; and distributing the second block to each node in the set of nodes in Step S180.

2. Applications

Generally, Steps of the method S100 can be executed by node connected over a network (e.g., a local area network, the internet) in order to generate a cryptographically secure and distributed record of time. More specifically, each node in the network can selectively query a subset of various external time sources (e.g., two of dozens of external time sources) for their current times and calculate a minor consensus time based on these received times regularly throughout operation (e.g., on a one-second interval). Upon designation as a leader node for a current time interval, a node can: selectively query a subset of other nodes (e.g., two of thousands of other nodes) for their current minor consensus times; calculate a major consensus time for the current time interval based on these received minor consensus times and the node's own concurrent minor consensus time; validate the major consensus time for the current time interval with other nodes in the network; generate a new cryptographic block containing the major consensus time (incremented by the elapsed time of this validation process); and distribute the new cryptographic block to nodes in the network, thereby both validating the current time internal and maintaining a consistent, distributed ledger of validated time interval throughout the network. Thus, any node (or other computing device connected to the network) can decrypt the latest cryptographic block (e.g., via a public or private key) distributed by the network in order to obtain a verified and secure time with very low probability that this time has been spoofed or otherwise tampered with. Therefore, the network of nodes can execute Steps of the method S100 to maintain a secure distributed source of time (e.g., in a blockchain with transaction information including timestamps or validated major consensus times); because this source of time is both secure and available on the network, electronic contracts, smart contracts, or financial transactions, etc. can be configured to trigger over the Internet based on secure times stored on the network.

During a time interval, each node in the network can selectively query current times from two (or more) external time sources in a set of external time sources, such as via an API call. For example, a node can reference two time sources from a group of time sources including: UTC, GPS time, Loran-C time, TAI, and/or other local time sources (e.g., locally maintained atomic and/or synchronized clocks). In this example, each node can pseudorandomly select time sources—from the set of time sources—to sample during a time internal. Alternatively, each node can execute a preferential selection function that preferentially selects more historically reliable time sources from this set and then query these time sources for their current times accordingly during a time interval.

Upon receiving a reported time from each sampled time source, a node can calculate a minor consensus time from amongst the reported times and the node's previously-verified time, such as derived from the most recent cryptographic block distributed to the node by a last leader node. In order to calculate the minor consensus time and/or a confidence interval for the minor consensus time, the node can implement Marzullo's algorithm, the median absolute deviation algorithm (hereinafter "MAD algorithm"), and/or any other univariate consensus algorithm resulting in a single time value and/or a confidence interval for the time value.

Once a node calculates a minor consensus time for the current time interval, the node can be designated as a leader node. For example, nodes in the network can solve for a proof-of-work problem, with the first node to solve this problem during the current time interval thus designated as the leader node. Alternatively, a centralized designation service can execute a randomized or probabilistic selection algorithm to select a leader node for the current time interval. If a node is not designated as a leader node, the node can enter a standby mode, such including responding to requests for the last minor consensus calculated by the node and/or responding to requests to validate a major consensus time. However, if designated at the leader node for the current time interval, the node can compile minor consensus times from various nodes in the network into a major consensus time. In particular, if the node is designated as a leader node, the node can sample at least two minor consensus times from two other nodes in the network. The node can then calculate a major consensus between minor consensus times received from these other nodes and the node's own concurrent minor consensus time according, such as according to the same set of algorithms that the node implements to calculate minor consensus times.

After calculating a major consensus as a leader node, the leader node can distribute the major consensus time to a set of nodes in the network along with a request to validate the major consensus time. For example, the node can distribute these validation requests to other nodes according to a Byzantine Fault Tolerance algorithm (hereinafter "BFT algorithm") or according to another network fault tolerance algorithm. Each other node that receives the validation request can then: determine whether the major consensus time received from the leader node during this time interval is within a threshold time difference or threshold confidence interval of its own minor consensus time; and return validation or rejection of the major consensus time to the leader node accordingly.

Upon receiving a validation response from a minimum proportion of nodes in the network, the leader node can: cryptographically hash a previous block and the validated major consensus time (e.g., as a Merkle tree) to generate a new block that stores the major consensus time (a "validated time") for the current time interval; and then store this new block in a chain of blocks containing major consensus times for previous time intervals (i.e. a secure a distributed time record). (In one implementation, the node can generate a block that includes the total elapsed time of the current consensus process.) The node can then distribute a copies of the new block to other nodes in the network.

After a node receives a new block, the node can: write the new block to its own copy of the chain of blocks; and synchronize its local (or "internal") clock to the validated time within this new block and/or based on an elapsed time of the current consensus process recorded in the new block. Thus, upon receipt of the new block, each node in the network gains access—such as via a cryptographic key—to a secure, validated time for the last time interval.

In one variation, the leader node can act as a metronome after generating the new block by generating successive blocks at a predefined time interval while other nodes in the network continue to perform the aforementioned Steps of the method, including: sampling a set of time sources; calculating a minor con. Thus, a designated metronome node can update the secure and distributed time record more frequently than the time required to reach a major consensus between nodes in the network.

A node in the network can also implement a traditional blockchain ledger and utilize an internal clock synchronized with the secure and distributed time record as the timestamp for each block in the blockchain, thereby providing secure timestamping for the node in the blockchain network.

Furthermore, a node on the network or another computing device connected to the network can execute a smart contract that triggers an outcome on another blockchain network in response to passage of a time duration or particular time according to the secure and distributed time record maintained by nodes in the network.

3. Local Time Sampling

Each node in the network configured to execute the secure and distributed time record can, at a first time (i.e. an initial sampling time), sample two time sources in a set of time sources in Step S110. More specifically, each node is configured to: select a subset of time sources from the set of time sources; request (e.g., via an API) the current time from the selected subset of time sources; receive a reported time from each subset of time sources; and/or normalize/correct the reported times.

The set of time sources can include any measure of absolute time such as UTC, GPS time, Loran-C time, TAI, and/or other local time sources (e.g., locally maintained atomic and/or synchronized clocks). Additionally, each node in the network can maintain its own set of time sources from which to sample. Furthermore, in one implementation, nodes can maintain a list of ten or more time sources from which to sample.

In order to sample from the set of time sources, each node must select a subset of the time sources from which to sample the current time. In one implementation, each node can pseudorandomly select from amongst the set of time sources. Alternatively, each node can monitor the latency, average accuracy (relative to the consensus time), and security of each source and implement a weighted selection algorithm that preferentially selects historically low latency, high accuracy, and high security sources as the subset of the time sources. In one implementation, each node selects at least one time source to sample from the node's set of time sources. In an alternative implementation, each node can select a subset of at least two time sources from which to sample.

Upon selecting the subset of time sources from which to sample, each node can request the current time from the time sources. In some cases, the node can request the current time via an API call to a server corresponding to each time source in the selected subset of time sources. Alternatively, the node can obtain the reported time from the time sources by polling specialized hardware (e.g., a GPS chip) communicating with a centralized time server or other synchronized clock.

Each node can then receive a set of reported times from the subset of time sources. In one implementation, the node can characterize the latency of each time source and subtract the latency from the corresponding reported time. Additionally, the node can normalize each reported time based on any known offsets between time sources.

In one implementation, the node can receive a reported time that includes both an absolute time estimate and a confidence interval indicating the potential error in the absolute time estimate from each time source.

4. Minor Consensus

After receiving reported times from a subset of time sources of the node, the node can calculate a minor consensus time between the two time sources in Step S120. More specifically, upon sampling the time sources the node can calculate a minor consensus time and/or a minor consensus confidence interval that best represents the reported time and/or the time at the node.

Each node can execute consensus algorithms such as Mazullo's algorithm to calculate the minor consensus time and time interval that satisfies the greatest number of input times and confidence intervals. Alternatively, each node can calculate the median of each of the reported times and the time at the node and execute the MAD algorithm to determine a confidence interval of the minor consensus time. Furthermore, the node can execute a probabilistic algorithm that weights each reported time based on the corresponding time source's historical accuracy and calculates a summary metric of the reported times and the node's own time.

In one implementation, each node calculates a minor consensus time based on three reported times received from three corresponding time sources. Alternatively, each node calculates a minor consensus time based on two reported times and the verified time at the node according to a most recent block in the secure and distributed time record.

However, each node can calculate a minor consensus via any algorithm that best approximates the absolute time based on at least one time source.

5. Leader Node Designation

Once a node has calculated a minor consensus time from amongst a set of time sources, the node can await designation of a leader node in the network of nodes. More specifically, any node in the network of nodes can be designated as the leader node, which calculates a major consensus time from amongst minor consensus times calculated separately at many nodes in the network. In one implementation, the network of nodes can designate a leader node by requesting a designation from a centralized designation service that can pseudorandomly and/or probabilistically designate a leader node from the set of nodes. In an alternative implementation, each node can complete a proof-of-work task and, upon completion of the proof-of-work task, designate itself as the leader node and thereby proceed in calculating a major consensus time from amongst multiple other nodes.

In implementations including a proof-of-work task, a centralized designation service can throttle the difficulty of the proof-of-work tasks in order to increase the likelihood that the proof-of-work task occurs within a particular time interval. In one implementation, the proof-of-work task can include a Hashcash algorithm, wherein the number of zero bits needed for a successful result can be throttled according to a desired block time of the distributed and secure time record.

In implementations including a centralized designation service, the centralized designation service can detect available nodes that have calculated a minor consensus time (e.g., via a broadcast from each node in response to calculating a minor consensus time). The centralized designation service can then randomly select a leader node from the detected available nodes upon detecting that greater than a threshold quantity of nodes are available for designation as the leader node. Alternatively, the centralized designation service can coordinate a leader election algorithm between available nodes (i.e. nodes that have calculated a minor consensus). For example, the nodes in the network can coordinate with the centralized designation service to perform the shout, mega-merger, or YO-YO leader election algorithms.

In one implementation, the centralized designation service can record the historical reliability (e.g., error and/or latency) associated with each node and preferentially designate nodes with higher reliability (e.g., lower error and/or latency) as the leader node. The centralized designation service can also randomly assign ID's to each of the nodes for each instance of the method S100 in order to ensure that a leader selection algorithm performed by the nodes is likely to result in a different leader node than for the previous block in the secure and distributed time record.

In one implementation, multiple nodes in the network can be designated as leader nodes (i.e. co-leader nodes). In this implementation, the centralized designation service can designate a first node as the primary leader node and can designate a second node as a back-up leader node such that, if the primary leader node fails to calculate an accurate major consensus time (e.g., a major consensus time is acceptable proportion of nodes), then the back-up leader node can provide its major consensus to the other nodes for validation to prevent excess delay in arriving at a validated major consensus time. The centralized designation service can designate any number of back-up leader nodes in order to prevent lapses in validating a new major consensus time.

However, the network of nodes and/or the centralized designation service can designate a leader node from the set of nodes in the network in any other way.

6. Major Consensus

Once a node has been designated via completion of a proof-of-work task at the node, via mutual designation in a leader election algorithm performed over the network and/or via designation by the centralized designation service, the node can, in response to designation of the node as a leader node for a first block: sample a second node in the set of nodes to obtain a second minor consensus time in Step S130; sample a third node in the set of nodes to obtain a third minor consensus time in Step S140; and calculate a first major consensus time between the minor consensus time of the leader node, the second minor consensus time, and the third minor consensus time in Step S150. Generally, the leader node can randomly or probabilistically sample a set of other nodes (which can include any quantity of nodes) in the network to obtain minor consensus times calculated by each of the sampled nodes before determining a major consensus time from amongst the sampled minor consensus times and the leader node's own minor consensus time.

In one implementation, the leader node can randomly select from amongst the other nodes in the network to obtain addition minor consensus times from which to calculate a major consensus time. In another implementation, the leader node can evaluate a probabilistic function that preferentially samples (e.g., increases the relative probability of sampling) nodes having particular characteristics. For example, the node can record the latency associated with each other node in the network and preferentially sample nodes with lower latency. In one example, the leader node can record the historical accuracy of another node's minor consensus times (e.g., compared to the verified time of each block of the secure and distributed time record) and preferentially sample nodes in the network that have higher accuracy (e.g., lower error when compared to the verified times in the secure and distributed time record). In one implementation, the leader node samples the minor consensus times of two other nodes in the network. Furthermore, the sampled minor consensus times can be encrypted upon transmission between nodes in order to prevent interception attacks on the network.

Once the leader node has sampled minor consensus times from other nodes in the network, the leader node can calculate the major consensus time based on the sampled minor consensus times and the leader node's own minor consensus time. The leader node can execute any of the aforementioned univariate consensus algorithms (e.g., Mazullo's algorithm, MAD). However, the leader node can calculate any summary statistic or evaluate any univariate consensus algorithms for the set of sampled minor consensus times and the leader node's minor consensus time in order to determine the major consensus time.

7. Major Consensus Acceptance

Upon calculating a major consensus time, the leader node can initiate a BFT algorithm by which the other nodes accept the major consensus time as calculated by the leader node. More specifically, the leader node can distribute a request to validate the major consensus time to each node in the set of nodes in Step S160; and, in response to receiving validation of the request from a predefined threshold quantity of nodes in the set of nodes, the leader node can generate a block for inclusion in the secure and distributed time record.

In one implementation, the leader node can broadcast a validation request for the major consensus time. The validation request can be encrypted and can include the major consensus time as calculated by the leader node. Upon receiving the validation request, each receiving node in the network can compare the major consensus time to each receiving node's calculated minor consensus time in order to determine if the major consensus time is within a threshold time interval of the minor consensus time of the receiving node (e.g., that the major consensus time is within 50 milliseconds of the major consensus time). If the major consensus time is within the threshold time interval, each receiving node can transmit a validation signal to the leader node to indicate that the major consensus time has been accepted by the receiving node.

After broadcasting the validation request to other nodes in the network, the leader node can await responses from nodes that have received and evaluated the validation request. The leader node can then tabulate the number of unique validation signals it has received from the other nodes in the network and, upon receipt of validation signals from greater than a threshold proportion of the nodes in the network (e.g., greater than two-thirds of the nodes in the network), the leader node can generate a new block of the secure and distributed time record.

The leader node can execute any BFT algorithm to validate the major consensus time according to other nodes in the network such as the practical BFT, Q/U, HQ, Zyzzyva, and/or ABsTRACTs.

If the leader node does not receive validation from the requisite proportion of nodes in the network within a predefined period of time, the leader node can indicate to the centralized designation service or to other nodes in the network that the major consensus time is not validated. In this case, a node designated as a back-up leader node can attempt to validate its major consensus time. This can continue until a major consensus time is validated by the requisite quantity of nodes in the network.

In one implementation, multiple nodes in the network can act as a leader node and can calculate and/or validate a major consensus time in parallel. The nodes can then communicate to determine which of the major consensus times received validation from the greatest proportion of the nodes in the network. The leader node that calculated the major consensus time with the greatest proportion of validations from other nodes in the network can then generate a block for the secure and distributed time record.

8. Step Generation

Upon validation of the major consensus time by other nodes in the network, the leader node, in response to receiving validation of the request from a predefined threshold quantity of nodes in the set of nodes, can: cryptographically hash a hash of a previous block and the major consensus time to generate a first block in Step S110. Thus, the leader node adds a block to a chain of blocks that define the secure and distributed time record by generating a cryptographic hash of the previous block in the secure and distributed time record and the validated major consensus time. More specifically, the leader node can implement a Merkel tree or hash tree in order to generate a single hash value that functions as a label of the new block.

The leader node can also hash additional metadata relevant to the validated major consensus time for inclusion in the new block of the secure and distributed time record such as a list of nodes that validated the major consensus time, the proportion of nodes that validated the major consensus time, or any other metadata. Furthermore, the leader node can hash additional metadata such as the elapsed time since the leader node sampled the set of time sources in order to produce a minor consensus time, the next time at which the nodes will execute the method S100, latency information between nodes, etc. Alternatively, the leader node can calculate the current time based on the initial sampling time and the major consensus time by calculating the difference between the major consensus time and the leader node's own clock at the initial sampling time.

The leader node can execute any cryptographic hash algorithm in order to generate a new block for the secure and distributed time record such as SH-1, SH-2, SH-3, Whirlpool, BLAKE2, RIPEMD-160, or MD5.

9. Step Broadcasting

After generating a new block (i.e. a new block in a blockchain) of the secure and distributed time record, the leader node can broadcast the new block to other nodes in the network. Because the new block indicates the major consensus time, each node that receives the new block can update its own clock such that its initial sampling time (the time at which the node sampled from a set of time sources) is synchronized with the major consensus time indicated in the new block. For example, if a node in the network recorded the initial sampling time as 1:00:00.52 and the major consensus time indicated by the new block was 1:00:00.67, the node can advance its clock by 0.15 seconds such that the node is synchronized with the major consensus time indicated by the new block. Furthermore, the leader node, upon broadcasting the major consensus time, can also synchronize its local clock with the major consensus time.

In one implementation, each node that receives the new block of the secure and distributed time record can then immediately initiate a second iteration of the method S100 in response to receiving the new block from the leader node such that the network can record a secure indication of the current time as often as possible. Alternatively, the new block can indicate to each node the time at which the node can execute the next iteration of the method S100. For example, the new block can indicate that the next sampling time can occur one second from the major consensus time.

10. Metronome Variations

In one variation, a designated node in the network can implement a metronome and generate a new block of the secure and distributed time record at an interval determined by the metronome. In this manner, the node can provide consistent and/or higher frequency updates to the secure and distributed time record that may not be possible by repeatedly executing Steps S110, S120, S130, S140, S150, S160, S170, and S180 (i.e. the time consensus process) of the method S100 across the network of nodes.

For example, if, on average, the network of nodes can generate a new block every 1.5 seconds with a high variance, and a particular application of the secure and distributed time record requires predictable time updates every second, it may be desirable to increase the frequency and consistency of the secure and distributed time record.

In one variation, a leader node can initially generate a new block for the secure and distributed time record, as previously described, by executing the time consensus process. The leader node that generated the most recent block can then synchronize its clock with the major consensus time it included in the most recent block and can then generate and broadcast successive blocks at a predefined metronome frequency (i.e. metronomically) until another node in the network executes a second iteration of the time consensus process and writes another block to the secure and distributed time record. Thus, by generating a block at a predefined frequency (e.g., generating a block after each successive metronome period) after executing the time consensus process, the leader node updates the secure and distributed time record at a frequency that is equal to or greater than the metronome frequency, thereby improving the consistency and frequency of the secure and distributed time record. In this variation, each block written to the secure and distributed time record can include an indication as to whether the block was metronomically generated or generated by executing the time consensus process. As a result, in this variation, the secure and distributed time record can include one or more metronomic blocks based on a most recent consensus block (i.e. a block generated by executing the time consensus process) bookended by consensus blocks that have been validated by the network. Thus, the secure and distributed time record can remain secure while operating at an arbitrarily high frequency.

In another variation, the centralized designation service can designate a separate node in the network as the metronome node, as opposed to the most recent leader node that generated a consensus block. In this variation, the designated metronome node can implement a BFT algorithm for each metronomically generated block in order to verify that each metronomically generated time included in the secure and distributed time record is not faulty when compared to the most recent verified time from the previous consensus block.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for secure and distributed timekeeping comprising:
   at a first node in a set of nodes in a network:
      at a first sampling time, sampling two time sources in a set of time sources; and
      calculating a first minor consensus time between the two time sources;
   at the first node and in response to designation, by the network, of the first node as a leader node for a first block of a blockchain:
      accessing a second minor consensus time generated by a second node in the set of nodes;
      accessing a third minor consensus time generated by a third node in the set of nodes;
      calculating a first major consensus time based on the first minor consensus time, the second minor consensus time, and the third minor consensus time; and
      distributing a request to validate the first major consensus time to each node in the set of nodes; and
   at the first node and in response to receiving validation of the request from a predefined threshold quantity of nodes in the set of nodes:
      generating a cryptographic hash of a previous block of the blockchain and the first major consensus time to generate the first block; and
      distributing the first block to each node in the set of nodes.

2. The method of claim 1, wherein generating the cryptographic hash comprises generating the cryptographic hash based on:
   the previous block of the blockchain;
   the first major consensus time; and
   an indication of a second sampling time.

3. The method of claim 1, further comprising, at the first node, receiving designation of the first node as the leader node from a central designation service.

4. The method of claim 1:
further comprising, at the first node, accessing the first sampling time and a second major consensus time from the preceding block; and
wherein calculating the first minor consensus time comprises calculating the first minor consensus time between the two time sources and the second major consensus time.

5. A method for secure and distributed timekeeping, the method comprising, at a first node in a set of nodes in a network:
sampling a first time source, in a set of time sources, for a first reported time;
sampling a second time source, in the set of time sources, for a second reported time;
calculating a first minor consensus time based on the first reported time and the second reported time;
in response to designation, by the network, of the first node as a leader node for a first block of a blockchain:
accessing a second minor consensus time generated by a second node in the set of nodes;
accessing a third minor consensus time generated by a third node in the set of nodes;
calculating a first major consensus time based on the first minor consensus time, the second minor consensus time, and the third minor consensus time; and
distributing, to each node in the set of nodes, a first request to validate the first major consensus time; and
in response to validation of the first major consensus time by a threshold quantity of nodes in the set of nodes:
generating a cryptographic hash based on a preceding block of the blockchain and the first major consensus time;
generating the first block comprising the cryptographic hash; and
distributing the first block to each node in the set of nodes.

6. The method of claim 5, wherein calculating the first major consensus time comprises:
characterizing a first latency of the first time source;
characterizing a second latency of the second time source; and
calculating the first minor consensus time based on the first reported time, the first latency of the first time source, the second reported time, and the second latency of the second time source.

7. The method of claim 5, wherein generating the cryptographic hash comprises generating the cryptographic hash based on the preceding block, the first major consensus time, the first minor consensus time, the second minor consensus time, and the third minor consensus time.

8. The method of claim 5, wherein generating the cryptographic hash comprises generating the cryptographic hash based on:
the preceding block;
the first major consensus time; and
a proportion of nodes, in the set of nodes, that validated the first major consensus time.

9. The method of claim 5:
further comprising, at the first node, receiving a first validation signal, in a set of validation signals, representing acceptance of the first major consensus time by a fourth node in the set of nodes; and
wherein generating the first block comprises generating the first block in response to a first quantity of validation signals, in the set of validation signals, exceeding the threshold quantity.

10. The method of claim 9, wherein generating the cryptographic hash comprises generating the cryptographic hash based on:
the preceding block of the blockchain;
the first major consensus time; and
a list of nodes that validated the first major consensus time, the list comprising the fourth node.

11. The method of claim 5, wherein generating the cryptographic hash comprises generating the cryptographic hash based on:
the preceding block of the blockchain;
the first major consensus time; and
an indication of a next sampling time.

12. The method of claim 5, further comprising, at the first node, receiving designation as the leader node of the first block based on execution of a proof-of-work task by the first node.

13. The method of claim 12, further comprising, at the first node:
receiving a difficulty level corresponding to a target time interval;
executing the proof-of-work task according to the difficulty level; and
receiving consensus from the network that the proof-of-work task designates the first node as the leader node.

14. The method of claim 5:
further comprising, at the first node, accessing a second major consensus time from the preceding block; and
wherein calculating the first minor consensus time comprises calculating the first minor consensus time based on the first reported time, the second reported time, and the second major consensus time.

15. The method of claim 5:
further comprising, at the first node:
receiving a second request to validate a second major consensus time calculated by a fourth node in the set of nodes;
transmitting a validation signal, in a first set of validation signals, to the fourth node in response to a difference between the second major consensus time and the first minor consensus time falling within a threshold time interval.

16. The method of claim 15:
wherein distributing the first request to validate the first major consensus time comprises distributing the first request to validate the first major consensus time in response to:
designation, by the network, of the first node as a secondary leader node for the first block; and
a first quantity of validation signals, in the first set of validation signals, falling below the threshold quantity.

17. The method of claim 5, further comprising, at the first node, selecting the first time source based on a historic accuracy of the first time source relative to consensus time.

18. The method of claim 5, further comprising, at the first node, synchronizing a local clock of the first node based on the first major consensus time.

19. A method for secure and distributed timekeeping, the method comprising, at a first node in a set of nodes in a network:

accessing a second block of a blockchain, the second block comprising a first cryptographic hash of a first block of the blockchain, a first major consensus time, and a first sampling time;

at the first sampling time:
    sampling a first time source, in a set of time sources, for a first reported time:
    sampling a second time source, in the set of time sources, for a second reported time;

calculating a first minor consensus time based on the first major consensus time, the first reported time, and the second reported time;

in response to designation, by the network, of the first node as a leader node for a third block of the blockchain:
    accessing a second minor consensus time generated by a second node in the set of nodes;
    accessing a third minor consensus time generated by a third node in the set of nodes;
    calculating a second major consensus time based on the first minor consensus time, the second minor consensus time, and the third minor consensus time; and
    distributing, to each node in the set of nodes, a first request to validate the second major consensus time; and in response to validation of the second major consensus time by a threshold quantity of nodes in the set of nodes:
    generating a second cryptographic hash based on the second block, the first major consensus time, and an indication of a second sampling time;
    generating the third block comprising the second cryptographic hash; and
    distributing the third block to each node in the set of nodes.

20. The method of claim 19, further comprising, at the first node:
    executing a proof-of-work task to designate the first node as the leader node; and
    receiving designation of the first node as the leader node for the first block in response to consensus from the network that the proof-of-work task designates the first node as the leader node.

\* \* \* \* \*